May 8, 1962     H. A. SLACK     3,033,654
GEOCHEMICAL PROCESS
Filed Oct. 17, 1957

INVENTOR.
HOWARD A. SLACK
BY
ATTORNEY 3,033,654
GEOCHEMICAL PROCESS
Howard A. Slack, Crystal Lake, Ill., assignor to The Pure
  Oil Company, Chicago, Ill., a corporation of Ohio
            Filed Oct. 17, 1957, Ser. No. 690,862
                    4 Claims. (Cl. 23—230)

This invention relates to a subsurface geologic method. It more specifically is concerned with a geochemical process for oil field exploration.

According to this invention, the presence of petroleum oil or gas contained in stratigraphic traps overlaid with an impermeable geological barrier and/or the direction of offset of the stratigraphic trap from a test well or wells can be determined by correlating the lateral variation in the istopic ratio of a gaseous constituent contained in gas samples obtained from the same rock stratum penetrated by a plurality of test wells.

For exploring geologic horizons and certain types of formations which are favorable for the occurrence and accumulation of oil, exploration geologists have available a variety of geophysical and geochemical prospecting techniques which can be used for determining subsurface geology by analysis of anomalies. In this work the oil field exploration geologist is aided by geophysical instruments, such as the seismograph, gravimeter, and magnetometer, which are used in carrying out the various geophysical prospecting methods in order to find favorable geological structures rather than the pool or accumulation of oil or gas ultimately sought. As an additional aid, information can be obtained by means of geochemical surveys. This latter approach is especially adaptable for exploring for oil or gas which accumulates in stratigraphic traps because these geochemical techniques employ some property of the oil or gas itself as opposed to a measurement of some significant physical property of the subsurface rock.

In prior art geochemical prospecting methods, a variety of organic constituents or inorganic constituents of gas or soil samples have been employed as diagnostic substances. According to these methods, a selected constituent is studied for alterations in chemical composition, concentration, or other properties to determine the extent of deviation of the preselected property from the normal condition that would exist in the absence of unusual subterranean conditions. One important use has involved the analysis of collected samples of soil gases for hydrogen, methane, hydrocarbon gases higher than methane, and other organic and inorganic constituents. In U.S. patent application, Serial No. 555,783, filed December 28, 1955, there is described a geochemical exploration method for determining the proximity of underground petroleum oil or gas reservoirs. In carrying out the process of the invention described in this application, the gaseous components of terranean samples are quantitatively and qualitatively analyzed for the respective amounts of constituents containing different isotopes of an element whereby the ratio of the amount of one stable isotope, e.g., $C^{12}$, to the amount of another stable isotope of the selected constituent, e.g., $C^{13}$, can be determined. To determine the proximity of the reservoir, the determined ratios are compared with normal ratios of the selected constituent to ascertain abnormal fluctuations. For example, if methane is selected as the criterion, the normal ratio of $$\frac{C^{12}H_4{}^1}{C^{13}H_4{}^1}$$

will be about 89.5:1. Fluctuations from this normal ratio indicate an abnormal subterranean condition which should be investigated more extensively. This method of geochemical exploration has advantages, including the use of methane as an indexing criterion. Prior art techniques in contradistinction have eschewed the use of methane because, although it may be present as a result of migration from a petroleum reservoir, its presence can also be accounted for as a result of vegetation decomposition or other causes which would give a false indication of the presence of a petroleum hydrocarbon reservoir. In interpreting the results obtained by this geochemical prospecting method, vertical variations in the isotopic ratios of a selected constituent were employed. While generally applicable as a method for use in the exploration for oil and gas reservoirs, limitations were imposed upon the process by the presence of impermeable or slightly permeable strata which overlaid oil and gas pockets. In these instances the gaseous emanations from the subterranean petroleum hydrocarbon accumulation diffused in a lateral direction along the oil or gas-bearing stratum or some other higher stratum which was below the barrier. This condition prevented the vertical diffusion of the gaseous emanations and minimized the effectiveness of the geochemical prospecting technique described in the above-mentioned application.

It is therefore the primary object of this invention to provide a geochemical prospecting method for the exploration of oil and/or gas accumulations in porous beds overlaid by an impervious stratum or stratum less permeable than the formation in which the petroleum hydrocarbons are contained. It is another object of this invention to employ isotopic anomalies as indexing criteria for determining the accumulation of petroleum hydrocarbons in structural stratigraphic traps which are below shaly or other impermeable or slightly permeable deposits which will prevent the substantially vertical passage of fluid emanations from the subterranean traps. These and other objects will become more apparent from the following detailed description of this invention.

Figure 1:
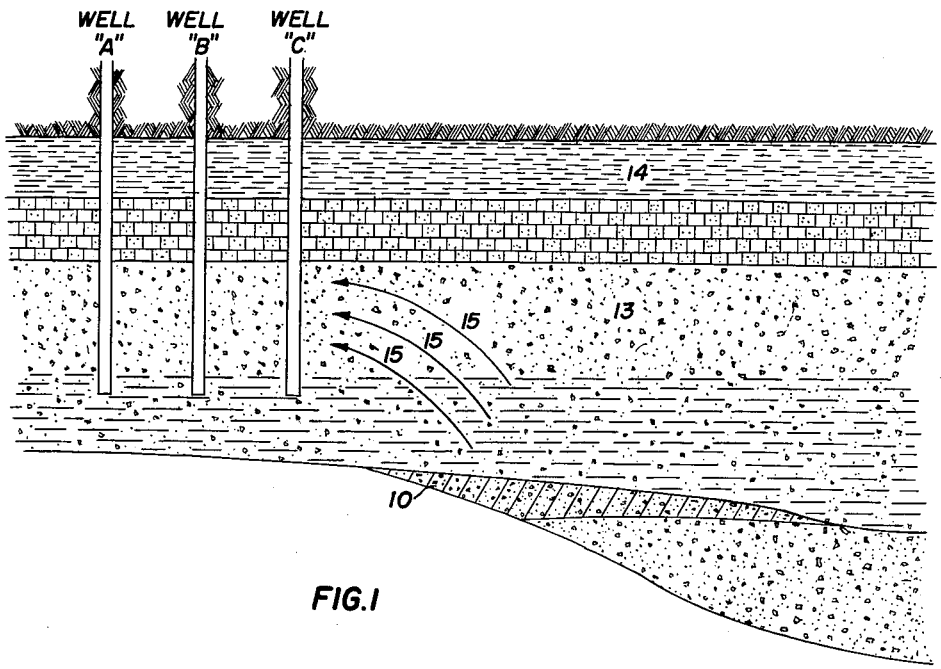
FIGURE 1 is a cross-section view illustrating a geological structure containing a petroleum oil reservoir overlaid by an impermeable stratum.

The use of isotopic ratios as a geochemical prospecting tool depends upon the establishment of a gradient or anomaly due to the fractionation process. The fractionation of the heavy and light isotopes requires the diffusion of the isotopes from an accumulation of hydrocarbons through the surrounding rock stratum in a gaseous form, or else through a continuous liquid (in this case water) phase. The presence of overlying "tight" (i.e., little or no permeability) strata will reduce if not eliminate diffusion in a vertically upward direction and hence prevent the fractionation process from taking place in the vertical direction. Shale strata or other types of impervious formations which are generally present over accumulations of hydrocarbon are in the category of "tight" formations which form seals. For this reason, any study of vertical variation of carbon or carbon compound isotope ratios as an indicator of buried hydrocarbon accumulations is affected by formations of this type. The presence of such overlying "tight" formations, however, in no way prevents lateral or horizontal diffusion from taking place in the reservoir stratum, and the fractionation process takes place horizontally and radially outward from most accumulations of hydrocarbon. According to this invention, the measurement of this lateral variation in carbon or carbon compound isotope ratio provides an effective means of detecting the presence, and direction, of offset accumulations.

The process of this invention is carried out by an analysis of gas samples obtained from a geological stratum subjacent an impermeable stratum by means of samples secured at selected points from a plurality of bore-holes which penetrate or traverse the stratum to be investigated. Gas samples can be obtained by collecting cuttings and analyzing the soil-gas contained in the cuttings, or analyzing the gas contained in the circulating stream of drilling mud. In addition, gas samples can be obtained from subterranean cores by means of sidewall coring devices. Still another means for obtaining gas samples for analyses is by degasifying formation waters produced. Collection of soil samples and recovery of the gaseous constituents occluded therein is adequately discussed in the prior art. For examples, see Subsurface Geologic Methods, cited supra, at p. 764, et seq.; Am. Assoc. Petroleum Geologists Bul., 24, pp. 859–881, as well as references on geochemical prospecting and well logging cited by Uren, Petroleum Production Engineering Development, 3rd ed., McGraw-Hill, 1946. Patent literature which discusses sampling techniques includes U. S. Patents 2,192,525; 2,324,085; 2,336,612, and others.

Preferably, the gas samples used in applying this method are obtained from various strata as exploratory or "wildcat" wells are being drilled, in accordance with conventional practice, in an area suspected of containing oil. These wells normally are drilled in widely-spaced patterns wherein adjacent holes may be from as little as one-half mile to as much as several miles apart. When the gas samples from each stratum are correlated according to the method of this invention, the direction in which additional wildcat wells are most likely to be productive can be postulated with greater certainty than has been possible heretofore.

In FIGURE 1 is shown a cross-sectional view of a geological structure containing an accumulation of oil in a rock reservoir 10 which consists of sandstone. Overlying reservoir 10 are several permeable limestone and siliceous formations 13 which are capped by impermeable shaly formation 14. The fluid emanations 15 from reservoir 10 diffuse upwardly into formation 13. Because their upward travel is blocked they are laterally deflected through formation 13 in which the above-described fractionation continues to be effected as the fluid moves radially. To carry out the process of this invention, samples of gas are collected from the selected rock stratum as each of a plurality of exploratory, or "wild-cat," wells are drilled into the formation sub-contiguous with the impermeable stratum. The selected indexing criterion, e.g., methane, contained in each of these gas samples is analyzed. If methane is selected, the ratio of heavy methane ($C^{13}H_4^1$) to ordinary methane ($C^{12}H_4^1$) is determined. A significant lateral variation in this ratio indicates that the gas has been fractionated by diffusion from a parent accumulation. Determination of the gradient of the surface formed by contouring these ratios indicates the direction from which they have diffused, and hence the direction of the accumulation.

Figure 2:
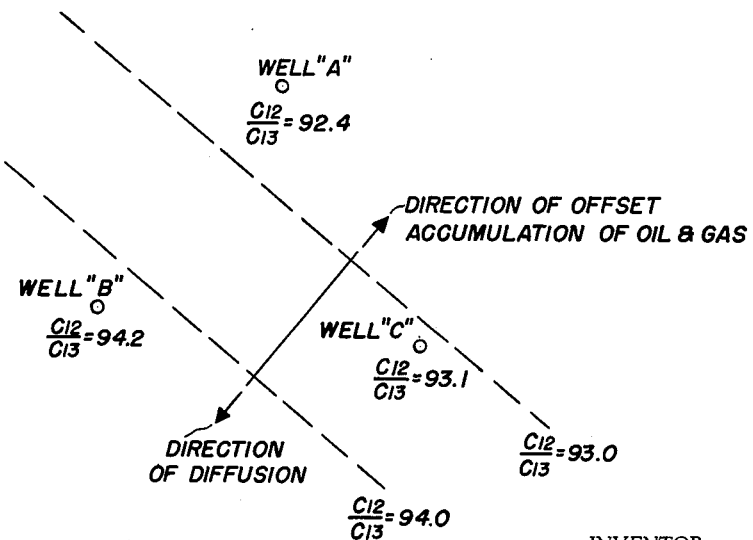
FIGURE 2 is a diagrammatic sketch illustrating the method of this invention.

As a specific example of the invention, three exploratory wells (A, B, and C) as shown in FIGURE 2, are drilled one mile apart without hitting oil. Oil is contained in a siliceous subterranean formation overlaid by an impervious shale and laterally displaced from the exploratory wells. Immediately subjacent the shaly stratum is a permeable dolomitic stratum. Samples of gas are separated from the drilling mud obtained while drilling through the dolomitic stratum in each well, and the methane contained in these samples is analyzed by means of a mass spectrometer to determine the ratio of ordinary carbon ($C^{12}$) to heavy carbon ($C^{13}$). The ratios shown on the drawing are obtained. By plotting the well locations and ratios, as shown, and adding the contour lines (or like isotope-ratio lines), it becomes visibly manifest that an oil and/or gas accumulation exists in the direction shown.

Because isotopic constituents of the samples employed in this prospecting method or correlation technique are present in relatively small amounts, and especially because of the difficulty in distinguishing between ordinary methane and heavy methane, ultra-sensitive detection and quantitative techniques must be employed. Although a number of methods are available, the mass spectrometer has been found to be the one best adaptable for the analysis of soil-gas for the micro-quantities of methane and heavy methane present in soil-gas. Although mass spectra, which are used for the qualitative determination of isotopes, can be produced by conventional mass spectrometers having an accuracy of better than 1%, preferably 0.1–0.01%, best results are obtained when a mass spectrometer especially designed for that purpose is used. Such an instrument is commercially available from the Consolidated Engineering Corporation. This instrument is adapted from a design of A. O. Nier, described in Rev. Sci. Inst., 18, p. 398 (1947). A detailed description of the apparatus is given by McKinney et al., Rev. Sci. Instruments, 21, 724 (1950). With this instrument, variations in $C^{12}H_4^1/C^{13}H_4^1$ ratios can be detected with an accuracy of about 0.01%. Because the handling of analytical samples, operation of the instrument, and calculations are well know in the prior art, no attempt will be made to give a detailed description of this collateral aspect of the invention. For greater detail, reference is made to Petroleum Processing, p. 515, May 1949; Symposium on Spectroscopy in Petroleum Industry, ACS Meeting, April 1955; and references cited therein.

As in other geochemical methods and techniques, the interpretation of the results of the subject geologic survey depends upon comparing abnormal results with normal conditions. If the samples of soil-gas have not diffused or effused a considerable distance through the earth, the normal ratio of ordinary methane to heavy methane will be about 89.5. However, if the gas has diffused laterally for a considerable distance, it will be relatively deficient in heavy methane. That is, the ratio of ordinary methane to heavy methane will be of the order of 95 to 100, although, in some cases, the ratio will be 100 to 125, or higher; and, in unusual instances, the amount of heavy methane will be so small that the ratio will be very large. In general, any ratio greater than about 90 is considered to be very significant, but if sufficient care is taken in the measurements, ratios in the range from 92 to 95 also will yield indicative information about the presence of petroleum. Even slight deviations from normal are useful under ideal conditions.

Although in the foregoing examples and detailed description of this invention, specific reference was made to the use of methane as the indexing gas, other gaseous substances obtained directly or occluded in said samples can be used. This includes the use of a hydrogen ($H^1$)-deuterium ($H^2$) ratio as well as ratios of $C_2$–$C_4$ hydrocarbons containing isotopes of carbon. However, it is preferred that heavy methanes be used. Although heavy methanes having molecular weights of other than 17 are known, the higher molecular weight methanes are present in such insignificant amounts that their application in the subject invention is impractical, and cannot be relied upon.

Impervious cap-rock strata, which will effectively prevent or retard the substantially vertical diffusion of fluid emanations originating from a subterranean accumulation of petroleum, gas or oil, consist essentially of shale, halite, or anhydrite, either per se or in combination with other types of rocks. In these latter formations, however, the impervious condition is due to the presence of at least one of the aforementioned rocks. Limestone can exist in substantially impervious form; however, in these formations hair-line cracks can exist which permit a vertical diffusion. It is therefore preferred that the samples employed in the process of this invention be collected from the stratum sub-contiguous to a shale, halite, or anhydrite formation. Other substantially impervious formations, however, can be used as the locater formation for the purpose of selecting the stratum from which the gas samples are to be obtained. Accordingly, in the appended claims the expression "substantially impervious, cap-rock stratum" is intended to include any geological structure having a permeability to gas of not more than about 10 millidarcies. It is to be recognized that a plurality of these cap-rock strata can occur intermediate a petroleum oil or gas reservoir and the surface. It therefore may be advantageous to carry out additional investigations at deeper depths if negative results are obtained from samples collected from the first permeable formation subjacent a cap-rock stratum.

The instant invention in its application as a gelogic survey tool is principally used as a complementary technique in conjunction with conventional gravimetric, magnetic, seismic, and electrical geologic survey methods and is applied most advantageously while drilling exploratory wells. It provides an improvement over prior art geochemical techniques employing total hydrocarbon analysis. In these methods, interpretation is generally difficult because of large variations in the statistical data obtained, which prevents the facile establishment of a convenient norm. This requires that substantial fluctuations in analyses, from what has been selected as normal, must occur in order to permit interpretation, a situation which does not generally obtain. By employing heavy methanes as the indexing gases, there is available a constant normal, and, as a result, slight variations from this normal are readily detectable and are significant. It is to be noted that the stated normal ratio of methane to heavy methane of about 89.5:1 was based upon extensive analyses of gas samples of terranean origin. However, a more comprehensive routine survey in various geographical locations may show different normal ratios to be 89–90:1. In any event, the deviation at the diffusion front from the established normal will be sufficient to permit a palpable interpretation of the data for application in determining the location of naturally-occurring, underground, petroleum reservoirs overlaid by an impervious cap-rock stratum.

I claim as my invention:

1. A geochemical prospecting process for determining the location of subterranean accumulations of petroleum in rock reservoirs overlaid by a substantially impervious, cap-rock stratum which comprises (1) traversing said cap-rock stratum with a plurality of exploratory bore-holes and penetrating a permeable stratum sub-contiguous with said cap-rock stratum, (2) collecting at least one terranean sample of said permeable stratum from each bore-hole, (3) removing occluded and adsorbed gases from said sample, (4) quantitatively and qualitatively analyzing said gases to determine the $C^{12}/C^{13}$ isotopic ratio therein, and (5) correlating the ratio obtained for each sample with respect to the surface geographical position of the bore-hole from which said sample was obtained whereby the presence of subterranean accumulations of petroleum hydrocarbons and the direction of offset of said accumulation from said boreholes is determined.

2. The method in accordance with claim 1 in which the gases from said samples are quantitatively and qualitatively analyzed for the respective amounts of methanes containing the $C^{12}$ and $C^{13}$ isotopes.

3. A geochemical prospecting process for determining the location of subterranean accumulations of petroleum in rock reservoirs overlaid by a substantially impervious, cap-rock stratum which comprises (1) traversing said cap-rock stratum with a plurality of exploratory bore-holes positioned at selected intersection points of a predetermined grid system covering a selected test site and penetrating a permeable stratum sub-contiguous with said cap-rock stratum, (2) collecting at least one terranean sample of said permeable stratum from each bore-hole, (3) removing occluded and adsorbed gases from said sample, (4) quantitatively and qualitatively analyzing said gases to determine the $C^{12}/C^{13}$ isotopic ratio therein, and (5) correlating the ratio obtained for each sample with respect to the surface geographical position of the bore-hole from which said sample was obtained whereby the presence of subterranean accumulations of petroleum hydrocarbons and the direction of offset of said accumulation from said boreholes is determined.

4. A geochemical prospecting process for determining the location of subterranean accumulations of petroleum in rock reservoirs overlaid by a substantially impervious, cap-rock stratum which comprises (1) traversing said cap-rock stratum with a plurality of exploratory bore-holes positioned at selected intersection points of a predetermined grid system covering a selected test site and penetrating a permeable stratum sub-contiguous with said cap-rock stratum, (2) collecting at least one terranean sample of said permeable stratum from each bore-hole, (3) removing occluded and adsorbed gases from said sample, quantitatively and qualitatively determining the mass spectrum for the respective amounts of methanes containing different isotopes of an element contained in said gases, whereby the ratio of amount of methane ($C^{12}H_4^1$) to the amount of heavy methane ($C^{13}H_4^1$) can be ascertained, (4) correlating these ratios with the normal ratio of said methane to said heavy methane to ascertain abnormal fluctuations in said ratios which manifest the propinquity of subsurface accumulations of petroleum hydrocarbons, and (5) correlating the ratio obtained for each sample with respect to the surface geographical position of the bore-hole from which said sample was obtained whereby the presence of subterranean accumulations of petroleum hydrocarbons and the direction of offset of said accumulation from said boreholes is determined.

References Cited in the file of this patent

UNITED STATES PATENTS 2,773,991    Bray ------------------ Dec. 11, 1956

OTHER REFERENCES

Craig: Geochimica et Cosmochimica Acta, vol. 3, No. 2/3, February 1953, pages 53–91; the more specific pages relied upon are 53, 64, 66, 77, 79 and 80.

West: Geophysics, vol. 10 (1945), pages 406–420; the more specific pages relied upon are 409, 418 to 420.